United States Patent
Brayton (10) Patent No.: US 10,565,836 B2
(45) Date of Patent: *Feb. 18, 2020

(54) NOTIFICATION AND ALERT METHOD FOR WEARABLE AND/OR OTHER DEVICES

(71) Applicant: Darryl Dwight Brayton, Richland, WA (US)

(72) Inventor: Darryl Dwight Brayton, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,109

(22) Filed: Oct. 23, 2018

(65) Prior Publication Data

US 2019/0057584 A1    Feb. 21, 2019

Related U.S. Application Data

(63) Continuation-in-part of application No. 15/407,522, filed on Jan. 17, 2017, now Pat. No. 10,109,164.
(Continued)

(51) Int. Cl.
*G08B 7/06* (2006.01)
*H04H 20/71* (2008.01)
(Continued)

(52) U.S. Cl.
CPC ............ *G08B 7/06* (2013.01); *H04H 20/71* (2013.01); *H04H 60/13* (2013.01); *H04L 51/10* (2013.01); *H04W 72/02* (2013.01)

(58) Field of Classification Search
CPC .......... G08B 7/06; H04H 20/71; H04H 20/88; H04H 60/13; H04L 47/10; H04W 72/02; H04W 88/085
(Continued)

(56) References Cited

U.S. PATENT DOCUMENTS

| | | | |
|---|---|---|---|
| 6,650,897 B2* | 11/2003 | Nelson | H04B 7/18506 455/431 |
| 6,987,947 B2* | 1/2006 | Richenstein | H04H 20/61 381/14 |

(Continued)

*Primary Examiner* — John A Tweel, Jr.
(74) *Attorney, Agent, or Firm* — Eugenio J. Torres-Oyola; Victor M. Rodriguez-Reyes; Ferraiuoli LLC (57) ABSTRACT

Systems and methods for delivering alerts, notifications and messages, to and, if configured, responses from one to many users wearing technology designed for single and/or multiple media types, utilizing one to many non-primary communication pathways enabled are contemplated in which (a) a primary communication channel pathway, (b) a primary or non-primary control channel(s) is established, by wireless receiver and/or wired connection to a group of users, that (b) then allows an activation method type to provide an alert/notification/message method to one-to-many persons (i.e., users) and/or, one-to-many devices in an addressable manner that establishes a non-primary communication channel path that is parallel and unknown to the primary communication channel path. The overall method consists of a router function and media delivery routing technology) that are actively listening on a primary communication/control pathway or a non-primary control channel. If an activation method is utilized over the communication pathway or non-primary control channel and an activation is designated for specific device(s) assigned within a specific non-primary communication channel pathway, then a delivery method for that device(s) is invoked that processes and delivers the non-primary media (audio, visual, and sensory) based on the command type, any local settings and the media type transmitted. In addition, the wearable device may also include connection to a specialized, logical audio router that manages non-primary communication channels and 'cut-ins' or 'super-imposition' functions for the delivery of alerts, notifications, and messages as an overlay on the primary communications channel that all users present may then hear, (Continued)

see, feel and/or respond via available methods through the appropriate primary and/or non-primary communications channel.

41 Claims, 4 Drawing Sheets

Related U.S. Application Data which is a continuation-in-part of application No. 14/251,454, filed on Apr. 11, 2014, now Pat. No. 9,955,264.

(60) Provisional application No. 61/810,712, filed on Apr. 11, 2016, provisional application No. 62/279,768, filed on Jan. 17, 2016.

(51) Int. Cl.
  *H04H 60/13* (2008.01)
  *H04W 72/02* (2009.01)
  *H04L 12/58* (2006.01)

(58) Field of Classification Search
  USPC .................................................. 340/539.11
  See application file for complete search history.

(56) References Cited

U.S. PATENT DOCUMENTS

| | | | |
|---|---|---|---|
| 7,194,235 B2 * | 3/2007 | Nykanen | H04L 47/10 |
| | | | 455/3.01 |
| 7,221,928 B2 * | 5/2007 | Laird | A61B 5/04 |
| | | | 455/404.1 |
| 8,108,895 B2 * | 1/2012 | Anderson | G06Q 30/02 |
| | | | 705/14.4 |
| 9,350,770 B2 * | 5/2016 | Yang | H04W 24/08 |
| 9,420,431 B2 * | 8/2016 | Swanson | H04W 4/046 |
| 9,632,746 B2 * | 4/2017 | Keipert | G06F 3/165 |
| 10,109,164 B2 * | 10/2018 | Brayton | G08B 7/06 |
| 2008/0090524 A1 * | 4/2008 | Lee | H04W 84/20 |
| | | | 455/41.2 |

* cited by examiner

NOTIFICATION AND ALERT METHOD FOR WEARABLE AND/OR OTHER DEVICES

RELATED APPLICATIONS

This application claims priority from U.S. Provisional Application 62/279,768, filed on Jan. 17, 2016, the contents of which are fully incorporated by reference.

BACKGROUND OF THE DISCLOSURE

Field of the Disclosure

The field of the invention is devices and methods for personal alert, notification and messaging and/or device-based alert, notification and messaging.

Background of the Invention

With today's advanced technologies, one can actually be integrated with other people in a community on-line via the Internet or by Local Area Network (LAN), yet still be isolated from basic security and/or notification, alerts and messaging, for example, a fire and smoke detector alarm in a home. Further, take the example of a 'gaming' PC application. While a person or a group of people are playing a game, like the X-Box™ by Microsoft®, they are probably all wearing some type of headphones for optimal game experience (wired or wireless) and watching a flat panel-type TV screen with game graphics—and fully absorbed and oblivious to the surroundings due to advanced sound proofing, noise cancellation and other features in today's headsets. However, the efficiency of the headphones to (a) reduce external sound via the earmuff or inset design and (b) optimize the hearing performance for game interaction, make external communication with any particular user practically impossible by any distance other than a few feet, and would certainly muffle even fire and smoke detector alarms. A far more practical example, though, is a simple notification of a parent calling to a child, or a spouse to their significant other, who is a member of that group of networked players, that dinner is ready (note that notifications could also be informational, or entertaining in nature, i.e., a tweet, etc., or a message)—a person delivering the communication may have to literally tap the person on the shoulder, perhaps having to go up/down a flight of stairs to accomplish this. And, if this is repeated night after night, then a solution is needed. Further, a user may not want to interrupt the game play if the audio feed is on a shared primary channel, as this innocuous alert would not be courteous to other players, if the alert was simply to come upstairs for dinner. In that case, a specific player's headset would need to be addressable to switch to a non-primary channel. This concept, of non-primary channels, then opens up the availability of game players to communicate on a non-primary communication channel(s) to their teammates to disclose specific advantages of strategic game movement by means of voice or text delivered by other than the shared primary channel that is available to all users.

Application US2016330538 by Eskenas, titled Audio Interrupter Alertness Device for Headphones, attempts to solve some of the problems recited above. Eskenas discloses an audio interrupter device that interfaces between an audio source and headphones to momentarily stop sound transmission to alert the user of an external sound above a threshold. However, this method does not perform encoding and decoding of data into an alert, notification or message to communicate through a non-primary channel; that is, its method does not anticipate having processors and/or functions that process commands, and then directly pass text-to-speech or allow live text feeds to be interpreted and then broadcasted as voice, text, vibration, or other sensory output, or allow synchronized interruption with transmission of audible voice or tones, text, or other sensory output on the primary and/or non-primary channel(s). Further, this method does not anticipate a user-generated response, either.

These devices currently do not perform encoding and decoding of data into an alert, notification or message to communicate the same through a non-primary communications channel; that is, they do not have processors and/or functions that process commands, and then directly pass text-to-speech or allow live text feeds to be interpreted and then broadcasted as voice, text, vibration, or other sensory output, or allow synchronized transmission of audible voice or tones, text, or other sensory output on the primary and/or non-primary channel(s).

Personnel trying to describe an emergency situation over a live Public Address (PA) announcement over a siren system and not trained in broadcasting and/or public emergency message construction and practices/methods would most likely be very hard to hear and therefore, understand. And these sirens could then also be equipped with reader-boards, Internet Protocol enabled speakers, and/or strobe lights that could be coordinated with text messages to direct their activities.

The technology path to tie encoded messages (alert, notification or other message and communication) to decoded messages represents a non primary communications channel technology that routes and connects people together. It should be appreciated that the delivery method for non-primary channel content could be a) cloud derived and generated notification and/or message and/or communications directly to one to many people and/or groups by address, and, b) encoded and delivered to a non-worn local device that provides the derived and generated notification and/or message and/or communications in the local proximity (low range transceiver and/or wired), decoded and then delivered directly to a set of headphones/heads-up display, screen display, etc., and c) encoded and delivered to a wearer's local device (e.g., headphones, heads-up display, screen) that provides the decoding and generated notification and/or message and/or communications to the user(s), and d) encoded and delivered to a device such as warning siren(s) or other audible wireless connected speaker for broadcast.

As an example, an aspect that is apparent is that the wireless headsets (or if implemented as such in the device(s) for the non-person(s) device use case) could also integrate the delivery method device(s) within the wireless headset(s) rather than as an external independent delivery method device(s). This would allow direct delivery to the person's wearable alert technology/gear (WAG™) wireless headsets/devices and also be used as routers of alert and notification control and/or data and/or media and/or response to other wireless person(s)' headsets/devices, and/or also as primary repeaters, and other wireless headsets (or devices for the non-person case) could act as secondary repeaters of alert and notification control and/or data and/or media and/or response with back-up router responsibility for a fault-tolerant local-network of alert and notification, and therefore messaging, for multiple persons(users)/devices on a non-primary channel.

As a further example, sports coaches could benefit from being able to communicate play assistance to players during a game. However, noise from the game venue could affect the microphone used by the coach, making it difficult to hear and understand what he is saying. These messages could be encoded to be repeated into the headset and then decoded as voice or displayed as text. An example would be in the Seattle Seahawks™ where the famous '12s' are keeping both an opposing football head coach, and his microphone, from communicating effectively to the Quarterback and then the Quarterback from being able to hear the potentially garbled message in a crucial play. Instead, the coach pushes the buttons 'Blue 42' and 'Watkins' as the play and the primary receiver respectively, and the play is sent wirelessly and encoded, decoded into a sentence by logic in the headset, and then a text-to-speech conversion is spoken plainly into the Quarterbacks headset. It could even have the Coach's voice as the resident library speaker. Touchdown! At least for the communication of the play effectively. Games of skill like chess and poker would also benefit from this, as it allows communication in a more compatible manner with the game's silent nature.

In another instance of use, such as gaming, a wearer of an enabled headset (by pushbutton, voice command, etc.) could actually generate either a voice message or an encoded message and uses a headset feature to generate delivery of the message to others that belong to his 'LAN party' (multi-player game with at least one primary audio channel). This would utilize an encoding enabled router function (in the headset, local external device including the game itself, or Internet—the so-called 'Cloud') or a generic router including the initiation of the non-primary channel code to open the communications pathway. At that point, the initiating person is alerted the channel is open and they may talk, information is communicated by VOICE, and then the non-primary channel may close, or be left open to await a response message. The primary channel could still play audio if desired/configured so that important information or situational awareness is not lost. Or an encoded signal is simply multi-cast to others IN CASE the original message sent external to this group by an outside entity was not received. In this case, identification of the communication initiation is coded with a unique identifier to avoid multiple notifications of the same message if already delivered successfully. Any responses can be paired to the original message, or can itself be a newly encoded message.

For example, in a game of strategy, John, via the method on the non-primary channel, sends a direct in-game message that warns co-virtual teammates Ted and Sally (one in the room and another in a different city) of an alien sneaking up on them in the game, but doesn't alert Sue and Johnny Boy (players on the other team(s)) that are on the same primary channel. This enables a 'LAN party' that is then capable of being hosted with this method but with a secondary channel, or the concept of a 'LAN party' within a 'LAN party'. You could even have multiple non-primary channels that would allow extension of this concept for multiple 'back-channel' conversations and exchanging of both text and audible information. The capability for response to a message, either with a pushbutton that decodes to 'understood' or 'received message' to actual voice response, etc., is also key.

If the person suffers from a disability, say they are deaf, vibration and/or heat/cold generation, could be utilized as a key technology that is wearable and could be integrated into a gaming 'suit' or piece of clothing to communicate an analog of the encoded message tied into the decoding to deliver an equivalent message.

The previous example also has a tremendous advantage for special operational forces in the military for situational awareness and stealth. When radio silence is required, audible or sub-audible commands can be sent to the unit commander's headsets in the field, transmitting key situational intelligence to and from a battlefield and/or conflict, rescue mission, special ops mission, etc. And, also between members of the team. The decoded information gives special information, say during a raid, in audible cases or as a heads-up text display in night vision goggles for the key team members to hear and see. In this case, extra security protocols would be layered onto the communications to prevent eavesdropping on the encoded messages and/or associated/non-associated responses.

Therefore, while numerous devices and methods for notification and alert are known in the art, none have yet integrated a non-primary notification and alert method that allows either remote and/or injection of multiple media (audio and/or visual) based on the system configuration for person(s) and/or device(s). Therefore, there is still a need for improved systems and methods, such as the method defined in this patent application that provides notification and alert to members of local groups, like families with new game technologies, but also, using the same method defined herein, notification and alert to members of the general public through more established technologies like sirens, strobes, and reader-boards, and even by extension, to Internet Protocol-enabled speakers.

SUMMARY OF THE DISCLOSURE

A method and system for delivering alerts, notifications and messages, to and responses from one to many devices, utilizing one to many non-primary communication pathways enabled, is disclosed.

Take for example, a grouping of people with wearable devices that are partaking in a 'LAN party'. The wearable devices include a primary media channel that behaves exactly as intended for that wearable device type. For instance, if a wearable device is a headphone with microphone, the primary media channel reproduces sound through the headphone speakers. However, the wearable device may also include connection to a specialized, logical audio router that manages non-primary communication channels and 'cut-ins' or 'super-imposition' functions for the delivery of alerts, notifications, and messages. When an alert, notification or message is sent (via a command type through the communication pathway that is processed) then a selected non-primary channel may be activated (or routed to) a wearable device, or set of wearable devices, to call attention to the user(s) that an alert, emergency, notification, or message has been activated and sent. The user(s) may then respond, if the path is enabled and choose to do so, on the same, or different, non-primary channel with an acknowledgement, command, text, text-to-speech, voice by microphone, or other means. It should be appreciated that the router mechanism is a software process that may be located internally or externally to the wearable device, allowing very large groups of individuals to utilize non-primary channel communications interrupt features via the Internet and 'Cloud' computing.

DETAILED DESCRIPTION OF THE INVENTION

Figure 1:
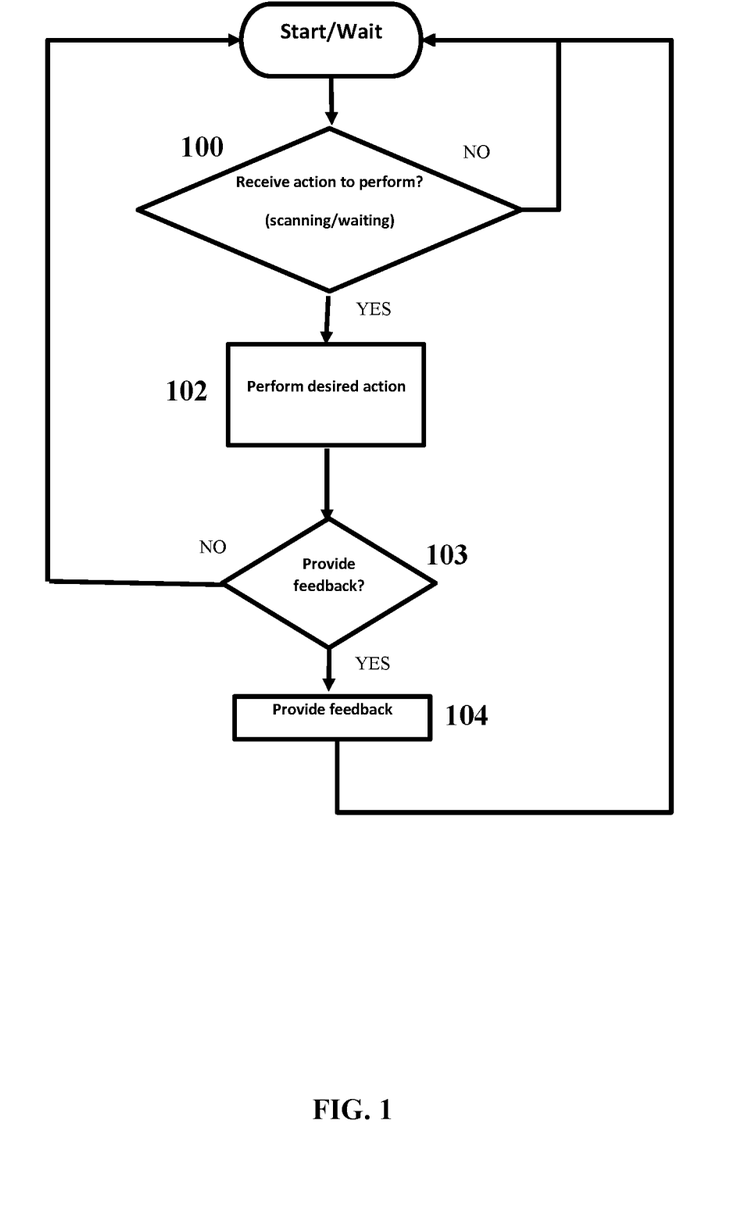
FIG. 1 shows an exemplary flowchart of many different methods of delivery to a wearable device, as possible given methods of delivery for the present disclosure.

As shown in FIG. 1, wearable devices may use a method 100 of scanning (polling), or waiting to have the media pushed to them in order to be activated and perform the desired action 102. These actions may include playing audio, displaying text, displaying graphics, delivering a vibration beeping, flashing, through a smart watch, and other types of alerts. The alerts may be directed to various users through one common channel that every user may listen in to or through separate private channels for every user. Users may provide feedback 103-104 after receiving a notification. The feedback may also be sent through a common channel or through a private channel where only the notification sender can receive it. The feedback 103-104 may be performed as an active decision of the user or as an automated response of the device, for example, GPS position coordinates.

Figure 2:
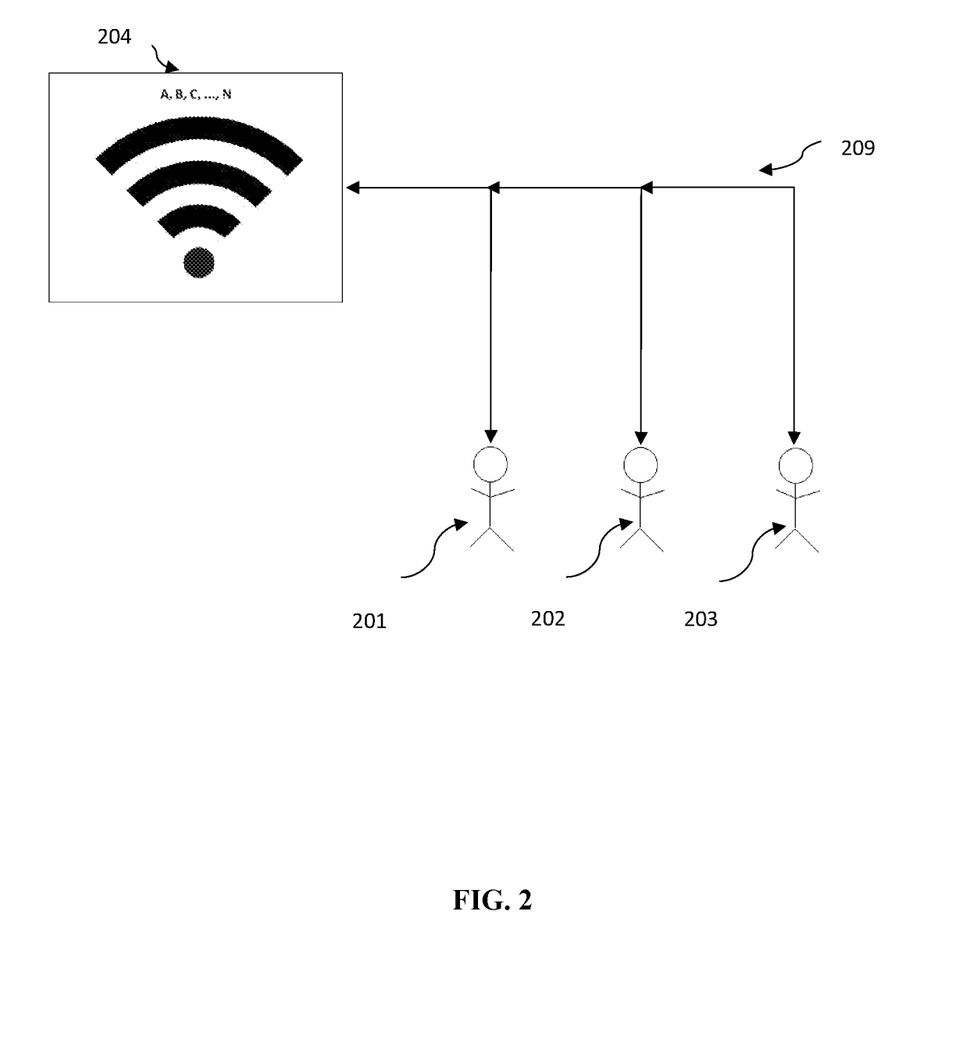
FIG. 2 shows an embodiment of the present system in accordance with the principles of the present disclosure.

FIG. 2 shows an embodiment of the present invention comprising wearable devices worn by users 200, 201, and 202 that are connected via a wired or wireless communication pathway 209 as a primary communications channel, as long as a communication path can be established (e.g. telecom networks, cellular networks, radio networks of various types including Bluetooth, Internet ('Cloud'), Intranet, cable television, satellite, other telecommunications and/or data highway technologies, and/or direct connection with cabled, wiring, fiber optic, and others). In this embodiment, the user (person) uses a piece of wearable technology gear, such as wired, or wireless headphones/headsets or other wearable devices such as ear buds, moldable ear inserts, bracelets, rings, pendants, ear-rings, hearing aids, ankle bracelets, bone conduction methods, vibration, bionics, or virtual reality headsets that would allow either audible transmission of alerts (hearing) and/or visual transmission of alerts (seeing) via images either as overlays on a screen, and/or new screen displays that are images/videos, and/or both audible/visual. These alerts could also be non-verbal and non-readable, such as vibrations, shocks, or flashing lights. The alert and notification delivery method is the method that produces the alert and notification when it receives the correct trigger via an activation method by an automated system and/or manually via another person.

Figure 3:
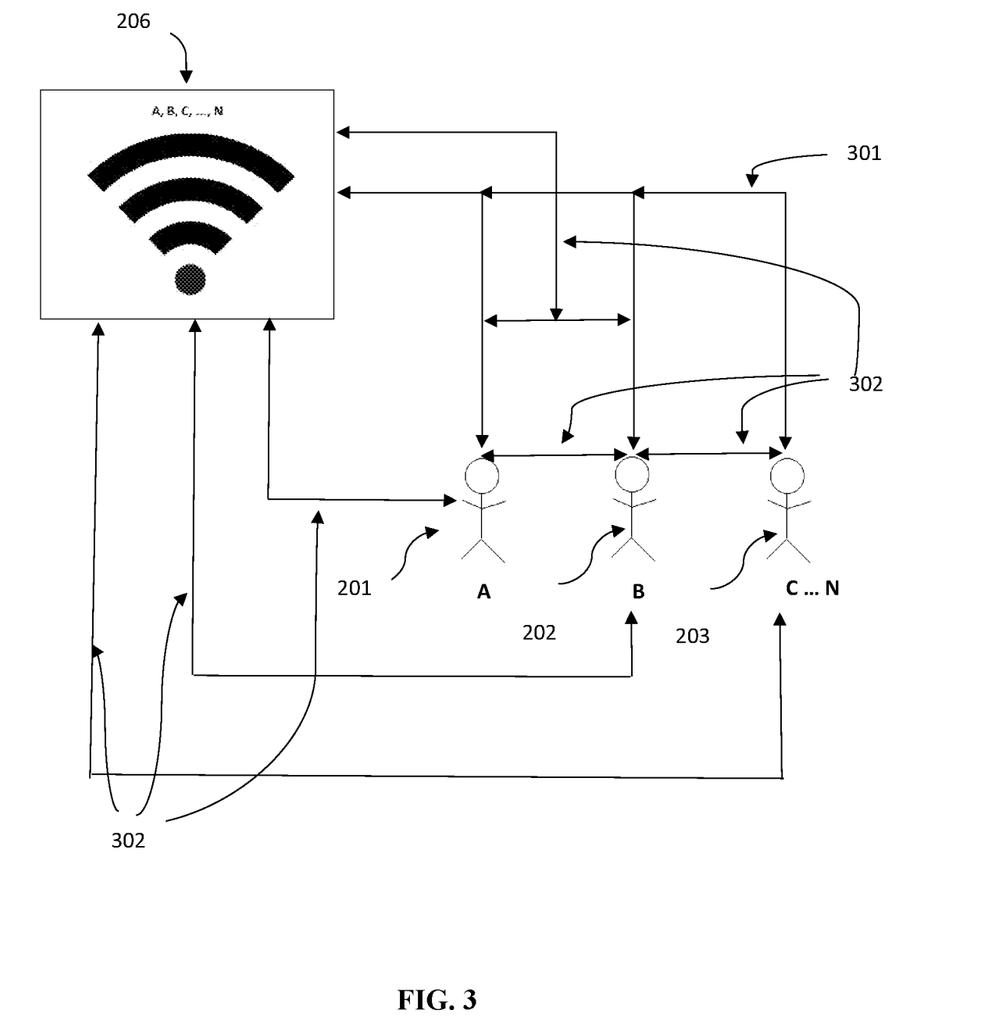
FIG. 3 shows another embodiment of the present system in accordance with the principles of the present disclosure.

As seen in FIGS. 2-3, the function of managing the alerts, notifications and messages can happen on the primary network 209, 301 or on a secondary, non-primary communications channel embodied in 302. The creation of a secondary, non-primary network within the construct of the primary communications channel 209, 301 is then processed by means of an addressable messaging to the various devices belonging to a specific group of subscribers. Subscription to a non-primary network may be due to a sign-up process, teaming process within an online game, automatic according to physical location, and/or some other definable attribute of association for the purpose of non-primary communications. If the wearable devices contain secondary, and physical radio channels, or spread-spectrum channels that allow frequency hopping then secondary channels may be physically constructed rather than virtually constructed by means of just addressing. That is, the primary and non-primary instances of communications channels could co-exist, in parallel, on different frequencies. Addressing, however, is still key in both instances for routing and pairing with possible user responses as in the response path of 206 to users 201, 202, and 203 through the primary channel 301 and secondary response from 206 to secondary response pathways 302 to a subscriber group or individual wearable device 201, 202, or 203 or some combination as appropriate. Secondary response pathways 302 also allow subscribers to communicate with each other in a private manner.

Initiation of control and media 204 or 206 may be remote or local, and by manual or automatic means. The manual means of initiation of control or media may be a parent calling into an on-line game and initiating a request to come upstairs for dinner to a subscription group of the parents two sons. In one instance, the automatic means of initiation of 204 or 206 may be a network router informing the same two sons that it is bed time according to a setting for allowed windows of playtime. In another instance, the automatic means of initiation of 204 or 206 may be a smoke detector that sends a proximity warning to those gamers (same two boys) that a fire has been detected and to exit the house. Further embodiments may include non-primary channels 302 through which the means of initiation may send notifications to select users of the group or users can privately send notifications to other select users instead of publicly through the main channel 301. The manual means of initiation of function 204 or 206 may be a gamer within the current grouping of primary wearable devices calling his teammates into an on-line game private back-line 'chat room' and initiating a request via a pushbutton on his headset or game controller. In one instance, the automatic means of initiation of function 204 or 206 may be this same user having set a timer function alerting his team to a coordinated attack on a target in a game of 'Halo™' with a non-primary channel sounding of a buzzer to synchronize the attach. It should be appreciated that anyone with a user wearable device 201, 202, and 203 connected to the primary communications channel network and in some cases, being a subscriber, may be able to participate in these alerts, notifications and messaging activities.

The routing, control and then media delivery functions are accessed by the initiating function of 204 or 206 the via multi-function communications path initiation request, through the primary communications channel 209 or 301, or the non-primary communications channel 302. This key function allows management of the routing processes; setting up non-primary channels through addressing when only a primary channel exists physically, superimposing text and sound and sensory to wearable devices on the primary channel's media, suppressing the primary channel's media to deliver a secure non-primary communication channel, addressing to the appropriate end users and subscription groups, and delivering the media in the correct format for the appropriate wearable device 201, 202, and/or 203 be it sound, visual, audible, text, sensory, graphical, or however the initiation request has been constructed. The appropriate wearable devices 201, 202, and/or 203 are delivered the requested media be it to a single end user, example 201, or a subscription group of end users, example 201, 202 and 203, and be it on the primary communications channel as an interruption to just those players and isolated from the primary communications channel media, or superimposed to allow the primary communications channel o still be heard in the background, or on a virtual non-primary communications channel or on an independent non-primary communications channel.

Figure 4:
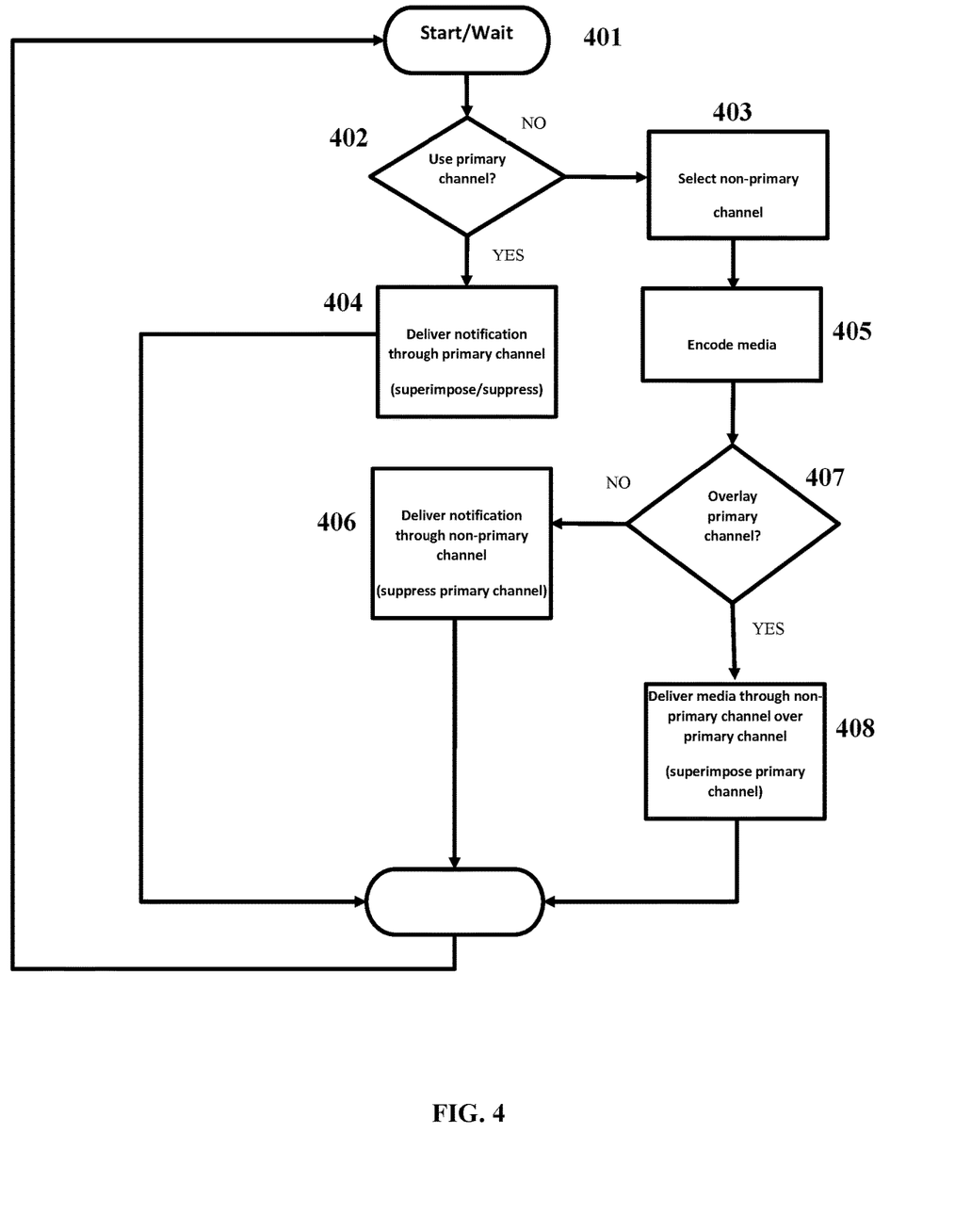
FIG. 4 shows an exemplary flowchart of an embodiment of the present invention in accordance with the principles of the present disclosure.

In FIG. 4, the routing control function is presented. First, the initiation request of 204 or 206, for an alert, notification or message is started 401. These functions may be co-located in a module, hardware or physically and logically distinct with appropriate interfacing to provide the key interface to communicate. The initiation request may be received locally or remotely. The decision 402 is made on whether delivery of notifications will be done through the primary or one of the non-primary communication channels. If not, 403, then a non-primary communications channel is selected, or constructed, and the media encoded for delivery 405. A decision is then made as to whether to superimpose or suppress the primary communications channel 407, and then deliver the audio, visual and/or sensory media to the end user in the non-primary environment as superimposed on the primary channel 408, or suppressing the primary channel 406. If the decision is made on 402 to use the primary communications channel for delivery, then method 404 is invoked to deliver the audio, visual and/or sensory media to the end user in the primary communication channel environment. By modifying the flowchart, however, you could also request superimposition on the primary channel in addition to suppression.

It will be apparent for persons skilled in the art that other variations of these embodiments could be constructed according to the state of the art and the teachings in this disclosure. For example, the routing function could combine with other routing functions on separate primary communication channels to form super-user-communities, for instance fan clubs in different cities listening to an on-line concert for a famous rock band, and then being able to have communications with the band if they win a contest on a private non-primary communications channel for a backroom chat. Also, the ability to combine non-primary groups could continue by forming non-primary groups within non-primary groups, and many unusual combinations based on subscription and/or communications needs.

The disclosure is not limited to the precise configuration described above. While the disclosure has been described as having a preferred design, it is understood that many changes, modifications, variations and other uses and applications of the subject invention will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

What is claimed is:

1. A system for alert and/or notification and/or messaging comprising:
    at least one wearable media comprising a primary media channel and at least one non-primary media channel,
    said at least one wearable media operatively connected to an activation device via an addressable communication pathway,
    said at least one wearable media comprising a notification protocol;
    wherein said notification protocol is initiated via a command trigger by the activation device;
    wherein said notification protocol is configured to receive digital media and encode it as a notification or alert or message;
    wherein said at least one wearable device is configured to decode and play back said digital media encoded as a notification or alert or message via the at least one non-primary media channel when the notification protocol is initiated; and
    wherein said activation device is configured to control which of the at least one wearable media receives digital media.

2. The system of claim 1, wherein the command trigger comprises a representation of an alert and/or notification and/or message to be reproduced via the at least one non-primary media channel.

3. The system of claim 1, wherein said at least one non-primary media channel is a physical media channel.

4. The system of claim 1, wherein said at least one non-primary media channel is a virtual media channel.

5. The system of claim 1, wherein said received digital media is superimposed over said primary media channel.

6. The system of claim 1, wherein said received digital media suppresses said primary media channel.

7. The system of claim 1, wherein the non-primary media channel is text-based.

8. The system of claim 1, wherein the non-primary media channel is audio-based.

9. The system of claim 1, wherein the non-primary media channel is a vibrating actuator.

10. The system of claim 1, wherein the non-primary media channel is light-based.

11. The system of claim 1, wherein the command trigger comprises a deactivate command.

12. The system of claim 1, wherein said activation device is configured to receive a notification acknowledgement from the at least one wearable media further comprising a notification acknowledgement trigger.

13. The system of claim 8, wherein the notification protocol comprises a decoding module; and wherein the decoding module is configured to modify at least an element of an audio alert and/or notification and/or message according to a preestablished attribute.

14. The system of claim 12, wherein the notification acknowledgement from at least one wearable media comprises a GPS coordinate location.

15. The system of claim 2, wherein the notification protocol comprises a text-to-voice capability, wherein the alert and/or notification and/or message is a text message.

16. The system of claim 2, wherein the notification protocol comprises a voice-to-text capability, wherein the alert and/or notification and/or message is a voice message.

17. The system of claim 2, wherein the at least one non-primary media channel is text and audio based.

18. The system of claim 2, wherein said activation device is configured to receive a response text message from the at least one wearable media.

19. The system of claim 2, wherein said activation device is configured to receive a response voice message from the at least one wearable media.

20. The system of claim 1, wherein said at least one wearable media may be sent the digital media individually via an addressable system.

21. The system of claim 20, wherein said addressable system identifies each of the at least one wearable media with a group.

22. The system of claim 20, wherein said addressable system identifies each of the at least one wearable media by physical proximity.

23. A method for alert and/or notification and/or messaging comprising the steps of:
   operatively connecting at least one wearable media comprising a primary media channel and at least one non-primary media channel with an activation device via an addressable communication pathway;
   receiving in said wearable media a command trigger from said activation device;
   receiving in said wearable media a command trigger from said activation device;
   initiating a notification protocol in said wearable media; receiving digital media;
   encoding said received digital media as a notification or alert or message;
   decoding and playing back said digital media encoded as an alert and/or notification and/or message via the non-primary media channel when the notification protocol is initiated; and
   wherein said activation device is configured to control which of the at least one wearable media receives digital media.

24. The method of claim 23, wherein the command trigger comprises a representation of an alert and/or notification and/or message to be reproduced via the non-primary media channel.

25. The method of claim 23, wherein said at least one non-primary media channel is a physical media channel.

26. The method of claim 23, wherein said at least one non-primary media channel is a virtual media channel.

27. The method of claim 23, wherein said received digital media is superimposed over said primary media channel.

28. The method of claim 23, wherein said received digital media suppresses said primary media channel.

29. The method of claim 23, wherein the non-primary media channel is text-based.

30. The method of claim 23, wherein the non-primary media channel is audio-based.

31. The method of claim 23, wherein the non-primary media channel is a vibrating actuator.

32. The method of claim 23, wherein the non-primary media channel is light-based.

33. The method of claim 23, wherein the command trigger comprises a deactivate command.

34. The method of claim 23, wherein said activation device is configured to receive a notification acknowledgement from the at least one wearable media further comprising a notification acknowledgement trigger.

35. The method of claim 34, wherein the notification acknowledgement from at least one wearable media comprises a GPS coordinate location.

36. The method of claim 23, wherein said activation device is configured to receive a response text message from the at least one wearable media.

37. The method of claim 23, wherein said activation device is configured to receive a response voice message from the at least one wearable media.

38. The method of claim 23, wherein said at least one wearable media may be sent the digital media individually via an addressable system.

39. The method of claim 38, wherein said addressable system identifies each of the at least one wearable media with a group.

40. The method of claim 38, wherein said addressable system identifies each of the at least one wearable media by physical proximity.

41. A system for alert and/or notification and/or messaging comprising:
   at least one wearable media comprising a media channel,
   said at least one wearable media operatively connected to an activation device via an addressable communication pathway,
   said at least one wearable media comprising a notification protocol;
   wherein said notification protocol is initiated via a command trigger by the activation device;
   wherein said notification protocol is configured to receive digital media and encode it as a notification or alert or message;
   wherein said at least one wearable device is configured to decode and play back said digital media encoded as a notification or alert or message via said media channel when the notification protocol is initiated; and
   wherein said activation device is configured to control which of the at least one wearable media receives digital media.

* * * * *